June 10, 1969 L. A. CAPRIO 3,449,044

MOTION PICTURE PROJECTOR

Filed Dec. 6, 1966

3,449,044
MOTION PICTURE PROJECTOR
Lawrence Anthony Caprio, Whitman, Mass., assignor, by mesne assignments, to Atlas-Rand Corporation, Clifton, N.J., a corporation of New Jersey
Filed Dec. 6, 1966, Ser. No. 599,453
Int. Cl. G03b 41/00, 21/46
U.S. Cl. 352—79     10 Claims

ABSTRACT OF THE DISCLOSURE

A motion picture projector is adjustable to accommodate two different film formats, the two formats having different image areas and different sprocket hole locations but the sprocket hole locations of the two formats having a significant lateral overlap. The projector employs a claw of width less than the overlap dimension of the sprocket holes and a drive for the claw that has a fixed locus of movement corresponding to the larger of the two spacings of the sprocket holes of the two formats so that both formats may be driven in the projector without changing the lateral position or length of throw of the claw.

---

This invention relates to motion picture projectors.

A recent development in the motion picture industry has been the so-called "Super 8" film format, an eight millimeter film that has a 50% larger image area in each frame than the heretofore standard eight millimeter motion picture film format. In addition, the perforations (film drive holes) in the "Super 8" format are considerably smaller than and offset with respect to frame position from the location in the standard eight millimeter film format. Both film formats are expected to be extensively used by the public and it is desirable to provide a motion picture projector capable of properly displaying both formats. Because of the relatively large differences in format configuration of these two types of film, presently available commercial projectors capable of displaying both formats have resorted to complex and redundant mechanisms such as two different sets of drive sprockets, a mechanism for shifting the film laterally, or the use of separate claws for each type of film format, in various combinations.

It is an object of this invention to provide a novel and improved motion picture projector which will properly display two different types of film formats in an arrangement employing a common film drive mechanism which arrangement is capable of displaying properly a reel of film which includes a length of film of one format spliced to a length of film of the other format.

Another object of this invention is to provide an uncomplicated and inexpensive motion picture projector capable of accommodating formats differing in the size and position of the image area and location of film drive holes which projector uses a single drive mechanism and does not laterally shift the film or the drive mechanism.

It is a particular object of this invention to provide such a projector for eight millimeter film which can accommodate both "Super 8" and standard eight millimeter film in independent strips or spliced together in a continuous strip.

The invention features a motion picture projector having a light source and a projection lens for projecting a particular size of film which accommodates two different formats of that film, one format having a different image area and a different film drive hole size and position from the image area and film drive hole size and position employed in the second format. The drive hole positions of said first and second said formats however, must have a significant lateral overlap. A fixed film guide structure is provided in the projector for laterally positioning the film as it is moved past in image aperture defined by that guide structure. The projector further includes a masking plate mounted for movement independently of and positioned in juxtaposition with the guide structure and having separate mask apertures for each of said formats. The masking plate is slidable relative to the guide structure for selectively aligning a desired one of the mask apertures with the image aperture in the guide structure. A film drive mechanism includes a claw whose lateral dimension is less than the significant overlap of the position of the drive holes in the two formats and a drive for the claw which drive moves the claw in a generally rectilinear locus to advance the film past the guide structure aperture to sequentially display images formed in successive frames of the film. Framing apparatus is provided to permit compensation for differing relative offset of the drive holes and the image areas in the two formats. Thus the invention provides a motion picture projector which enables proper display of two different film formats individually or spliced together without need to reset drive or guide structures to accommodate the transition between the two formats and without damage to the film.

Other objects, features, and advantages of the invention will be seen as the following description of a particular embodiment thereof progresses, in conjunction with the drawings, in which.

Figure 1:
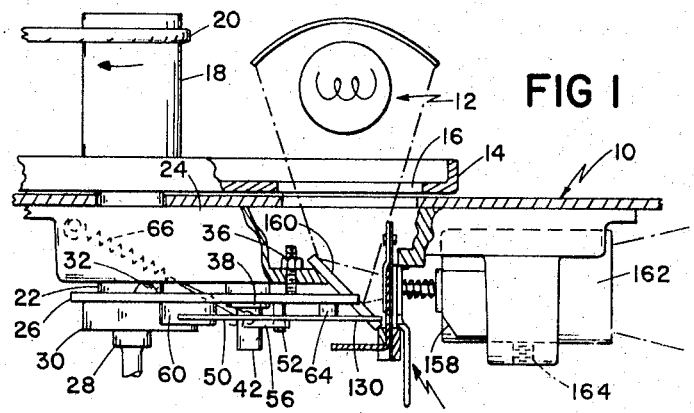
FIG. 1 is a top view of the projection portion of a motion picture projector according to this invention.

There is shown in FIG. 1 the projection portion of a motion picture projector. Light source 12 is mounted on base structure 10. Shutter disc 14 has three equal and equally spaced apertures 16 and is mounted on shaft 28. Pulley portion 18 of the shutter disc is driven by a motor (not shown) through belt 20. Shaft 28 extends through permanently lubricated bearing 22 which is assembled into casting 24. Casting 24 forms the basic support for the film guide structure, the lens unit and the framing plate 26. Claw cam 30 is directly mounted on shaft 28. The end of shaft 28 is of reduced diameter and extends to the exterior of the projector where a knob or the like is secured to it to allow manual movement of shaft 28 by the operator.

Figure 2:
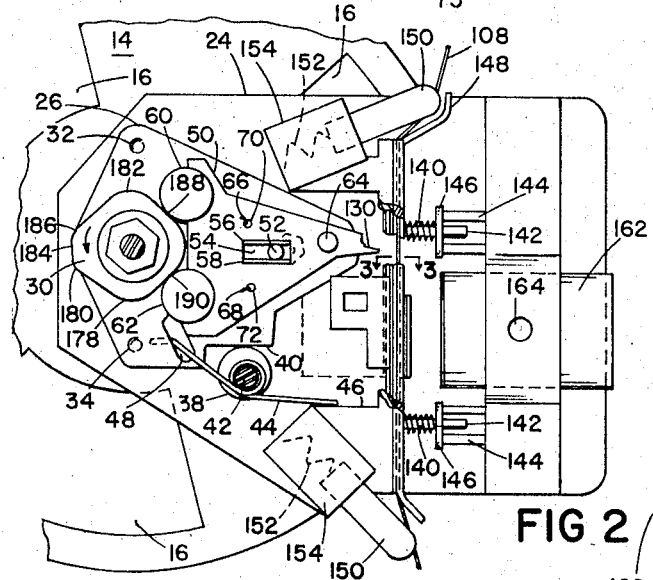
FIG. 2 is a side view of the projection portion shown in FIG. 1.

Framing plate 26 is pivotally mounted on the outside diameter of bearing 22 and bears against the surface of casting 24 on three points consisting of two detents 32 and 34 (FIG. 2) and a set screw 36 which, in addition, enables lateral adjustment of the position of the framing plate. The position of the forward end of the framing plate, FIG. 2, is vertically adjusted by engagement of follower surface 40 with cam 38 mounted at the bottom edge of framing plate 26. Cam 38 is mounted for rotation with shaft 42 which is journaled in casting 24 and extends to the exterior of the projector and terminates in a knob or the like for manual adjustment by the operator. Positive contact between cam 38 and surface 40 is insured by toggle spring 44 mounted on shaft 42, one end of which engages ledge 46 of casting 24 and the other end of which engages the lower side of aperture 48 in framing plate 26.

Claw plate 50 is mounted on framing plate 26 for movement about pivot pin 52 which extends perpendicularly from framing plate 26 through slot 54 in claw plate 50. Walls 56 and 58 on the sides of slot 54 increase the bearing area between pivot pin 52 and claw plate 50. At the rear of claw plate 50 are mounted discs 60 and 62 which function as follower surfaces for claw cam 30. They are considerably thicker than claw plate 50, extending sufficiently rearwardly of plate 50 to slidably space the claw plate from the framing plate. Disc 64 similarly spaces the forward end of claw plate 50 from framing plate 26. Springs 66 and 68 attached between casting 24 and holes 70 and 72 respectively, hold claw plate 50 against framing plate 26 and against claw cam 30.

Figure 3:
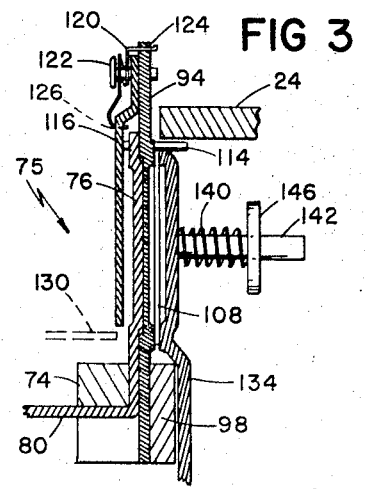
FIG. 3 is an enlarged view of the film alignment assembly taken along the line 3—3 of FIG. 2.
Figure 4:
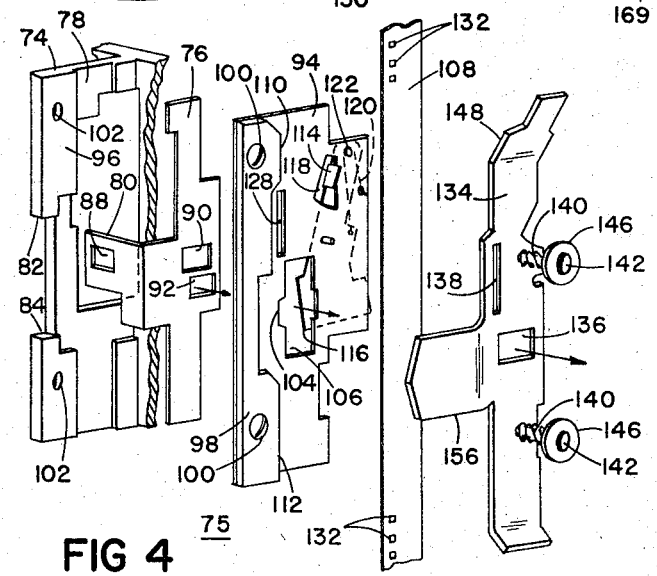
FIG. 4 is an exploded perspective view of the film alignment assembly which forms a part of the projection portion shown in FIG. 1.

Wall 74 projecting laterally from casting 24, FIGS. 3 and 4, receives masking plate 76 in shallow groove 78; masking plate 76 is slidable in groove 78 to the limit imposed by the contact of control tang 80 with the upper edge 82 and lower edge 84 of the recess in wall 74. Aperture 88 cooperates with an external knob that places masking plate 76 in one or the other of its vertical positions. The lower position sets the "Super 8" film mask aperture 90 in the projection path, while the upper position sets the standard film mask aperture 92.

Film guide structure 94 is secured to wall 74 and keeps masking plate 76 confined to groove 78 and is held tightly to the front face 96 of wall 74 by mounting guide plate 98 which is secured by screws 100 in tapped holes 102. Widened center portion 104 of aperture 106 in guide structure 94 defines the area with which the frame of the film to be projected is positioned and with which the selected one of mask apertures 90 and 92 must be aligned.

Film 108 is constantly, laterally biased toward aligning edges 110 and 112 of guide plate 98 by finger 114 which protrudes through triangular opening 118 and is connected to baffle 116. The force of spring 120 on baffle 116 urges the baffle to a closed position, i.e., covering aperture 106, unless film is present at the upper end of film guide structure 94. Baffle 116 is pivotally mounted on pin 122 and is sufficiently spaced rearwardly of film guide structure 94 to allow masking plate 76 to be received between it and structure 94. Spring 120 is a toggle spring mounted on pin 122 and attached to hole 124 in film guide structure 94 and hole 126 in baffle plate 116. Elongated slot 128 permits claw 130 on the forward portion of claw plate 50 to pass through film guide structure 94 and engage drive holes 132 in film 108. Film 108 is held in position against the film guide structure 94 by pressure plate 134 having an aperture 136 coinciding with center portion 104 of aperture 106, and a slot 138 coinciding with slot 128. Pressure plate 134 is kept in place by the force of springs 140 as compressed along pins 142 by stops 144 through washer 146.

Curved ends 148 of pressure plate 134 accommodate the curvature of film 108 as it passes about snubbers 150. Mild tension is maintained on film 108 by springs 152 in housings 154 urging snubbers 150 outwardly.

Thumb piece 156 of pressure plate 134 permits plate 134 to be pushed forward compressing springs 140 and to be slid laterally with washers 146 being moved along angled sides 158 of stops 144 whereby the pressure plate may be easily removed.

After passing through shutter 14 the output of light source 12 is reflected by mirror 160 through the series of openings in masking plate 76, and film guide 94 through a frame of film 108 and through the opening in pressure plate 134. The light is then focused by lens unit 162, which focus may be adjusted by means of shaft 164 which moves unit 162 toward and away from film 108.

Figure 5:
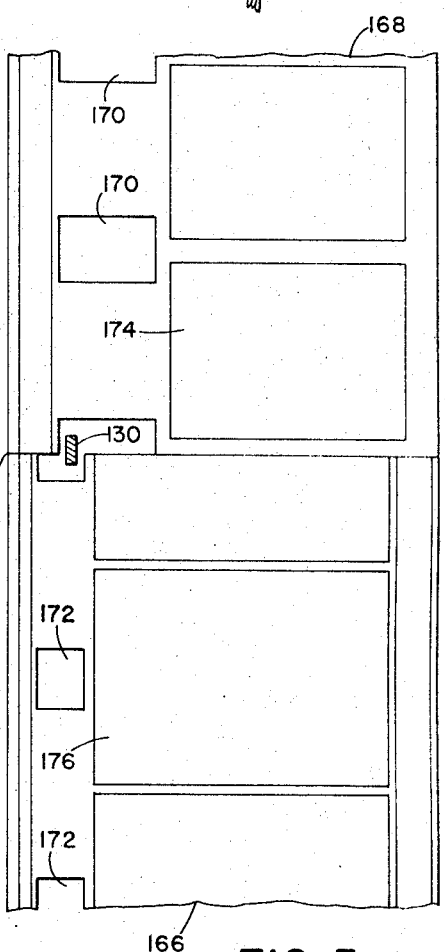
FIG. 5 shows a strip of standard eight millimeter film spliced to a strip of "Super 8" eight millimeter film.

A length of a "Super 8" film strip 166 connected to a standard eight millimeter film strip 168 by splice 169 is shown in FIG. 5. (The splice 169 may obviously be made between drive holes rather than involving two holes as shown.) Film drive holes 170 in standard film strip 168 are larger than the drive holes 172 in "Super 8" film strip 166, and are positioned along the line between the frame 174 whereas holes 172 are positioned along the center line of the frames 176.

Both types of eight millimeter film are 0.314 inch wide. Drive holes 170 are 0.036 inch from the edge of the film and are 0.072 inch wide. Drive holes 172 are only 0.020 inch from the edge of the film and are only 0.036 inch wide. Each image frame area 174 is 0.172 inch wide and 0.129 inch high, while each image frame area 176 is 0.211 inch wide and 0.158 inch high. The overlap of drive holes 170 and 172 is 0.020 inch, ample space for claw 130, which is merely 0.012 inch wide to drive either frame format without having to change position.

In operation, light source 12 is energized and shutter 14 and claw cam 30 are rotating counterclockwise driven by belt 20. Shutter 14 is timed with claw cam 30 to expose each frame immediately after it is positioned. The movement of claw 130 is dictated by the shape of claw cam 30. Each revolution of shaft 18 as cam contour 178 moves to contact disc 62 causes claw 130 to move forward and slightly upward aligning itself with a sprocket hole in the film. Next, cam contour 178 bears on disc 60 while cam contour 180 bears on disc 62 and claw 130 is driven straight forward through the sprocket hole. As cam contour 180 moves to disc 60 and cam contour 182 moves to disc 62 claw 130 begins to move downwardly drawing the film with it. Claw 130 dwells while disc 60 rides on cam slope 184 and disc 62 rides on cam slope 186, then retracts when disc 60 engages cam slope 186 and disc 62 engages cam slope 188. Further retraction occurs as disc 60 engages cam slope 188 and disc 62 engages cam slope 190, then the cycle begins again.

With "Super 8" film coursing through the projector masking plate 76 is in the down position in which mask 90 is in registration with apertures 104 and 136. When the splice 169 passes the apertures, no film drive or guide structure is shifted (thus avoiding damage to the film which may occur in other types of projectors where such shifting is necessary) and the operator merely slides masking plate to the up position placing mask 92 in line with apertures 104 and 136 for proper display. Because drive holes 170 are one-half frame out of phase with drive holes 172 a film segment adjacent the splice (as framed by mask 92) contains an upper half of one frame and lower half of the next frame. This is corrected by rotating cam 38 approximately one-half turn until an entire image area 174 is properly contained in mask 92. The locus described by claw 130 is now repositioned and will drive succeeding frames of film strip 168 into proper position with mask 92 without further intervention by the operator.

While a particular embodiment of the invention has been shown and described, modifications thereof will be apparent to those skilled in the art and therefore it is not intended that the invention be limited to the disclosed embodiment or to details thereof and departures may be made therefrom within the spirit and scope of the invention as defined in the claims.

What is claimed is:

1. A motion picture projector having a light source and a projection lens for projecting a particular size of film and accommodating first and second frame formats of that film, said first format having a different image area and a different sprocket hole positioned from said second frame format, the sprocket hole positions of said first and second formats having a significant lateral overlap, comprising:

a fixed film guide structure for laterally positioning the film, said guide structure defining an aperture sized to accommodate the image areas of both of said formats, a masking plate mounted for movement independently of, and positioned in juxtaposition with said guide structure, and having a mask aperture for each of said formats, said masking plate being movable relative to said guide structure for selectively aligning a desired one of said mask aperture with said guide structure aperture, and a film drive mechanism including a claw whose lateral dimension is less than said significant overlap of the sprocket holes, and a drive for said claw, said drive moving said claw in a generally rectilinear locus to advance film past said guide structure aperture.

2. The projector of claim 1 further comprising a framing mechanism for adjusting the locus of said claw to center the image area of film in alignment with the selected mask aperture and said guide structure aperture.

3. The projector of claim 1 in which said masking plate is positioned between said film guide structure and said light source, and the film passes on the side of said film guide structure remote from said light source, and further including a pressure plate having an aperture sized to accommodate the image areas of both of said formats for holding the film against said film guide structure.

4. The projector of claim 1 in which said film guide structure includes a fixed alignment element extending parallel to the film path for defining the position of one edge of the film, and a spring biased side guide for urging the film against said alignment element.

5. The projector of claim 1 wherein said film drive mechanism includes a claw plate with a guide slot and a cam follower surface, a pivot pin for engagement with said slot, and a claw cam responsive to said drive for driving said claw plate through engagement with said follower surface, said claw plate having said claw formed thereon.

6. The projector of claim 5 further comprising a framing mechanism for adjusting the locus of said claw to center the image area of film in alignment with the selected mask aperture and said guide structure aperture including a framing plate, to which said pivot pin is attached, for slidably supporting said claw plate, and a framing cam contacting said framing plate for controlling the position of the framing plate in the direction of the film travel.

7. The projector of claim 6 in which said framing plate is rotatably mounted about the axis of said claw cam and further including a first spring for maintaining said claw plate follower surface in contact with said claw cam and a second spring for maintaining said framing plate in contact with said framing cam.

8. The projector of claim 7 in which said masking plate is positioned between said film guide structure and said light source, and the film passes on the side of said film guide structure remote from said light source, and further including a pressure plate having an aperture sized to accommodate the image areas of both of said formats for holding the film against said film guide structure.

9. The projector of claim 8 in which said film guide structure includes a fixed alignment element extending parallel to the film path for defining the position of one edge of the film, and a spring biased side guide for urging the film against said alignment element.

10. The projector of claim 1 wherein said claw drive moves said claw through a locus of fixed, predetermined length.

References Cited

UNITED STATES PATENTS

| | | | |
|---|---|---|---|
| 1,869,852 | 8/1932 | Kindelmann | 352—226 |
| 1,898,173 | 2/1933 | Dina | 352—79 |
| 2,793,562 | 5/1957 | Grenzig | 226—64 X |
| 2,834,249 | 5/1958 | May | 226—64 |
| 3,338,490 | 8/1967 | Hara | 226—64 |

OTHER REFERENCES

Journal of the SMPTE, vol. 71, August 1962, p. 558.
Journal of the SMPTE, vol. 73, July 1964, p. 541.

NORTON ANSHER, *Primary Examiner.*

M. H. HAYES, *Assistant Examiner.*

U.S. Cl. X.R.

352—162